C. W. H'DOUBLER.
PNEUMATIC DRILL.
APPLICATION FILED FEB. 3, 1919.
1,408,176.
Patented Feb. 28, 1922.
2 SHEETS—SHEET 2.
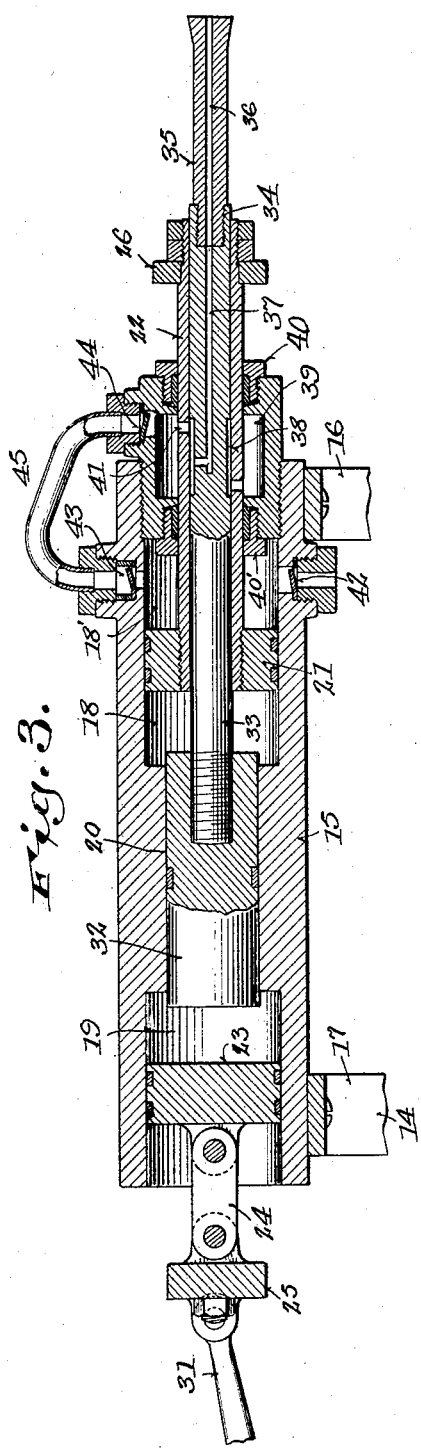
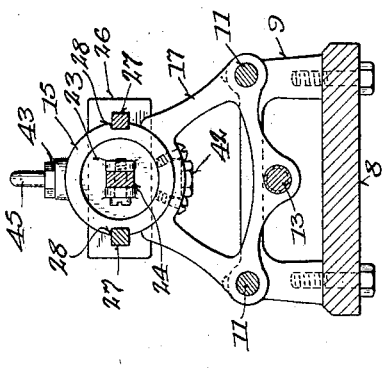
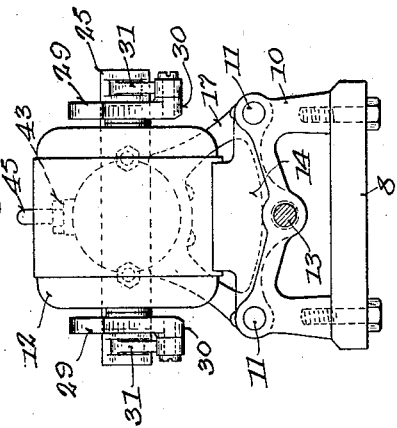
Inventor
Charles W. H'Doubler
By Morsell & Keeney
Attorneys.

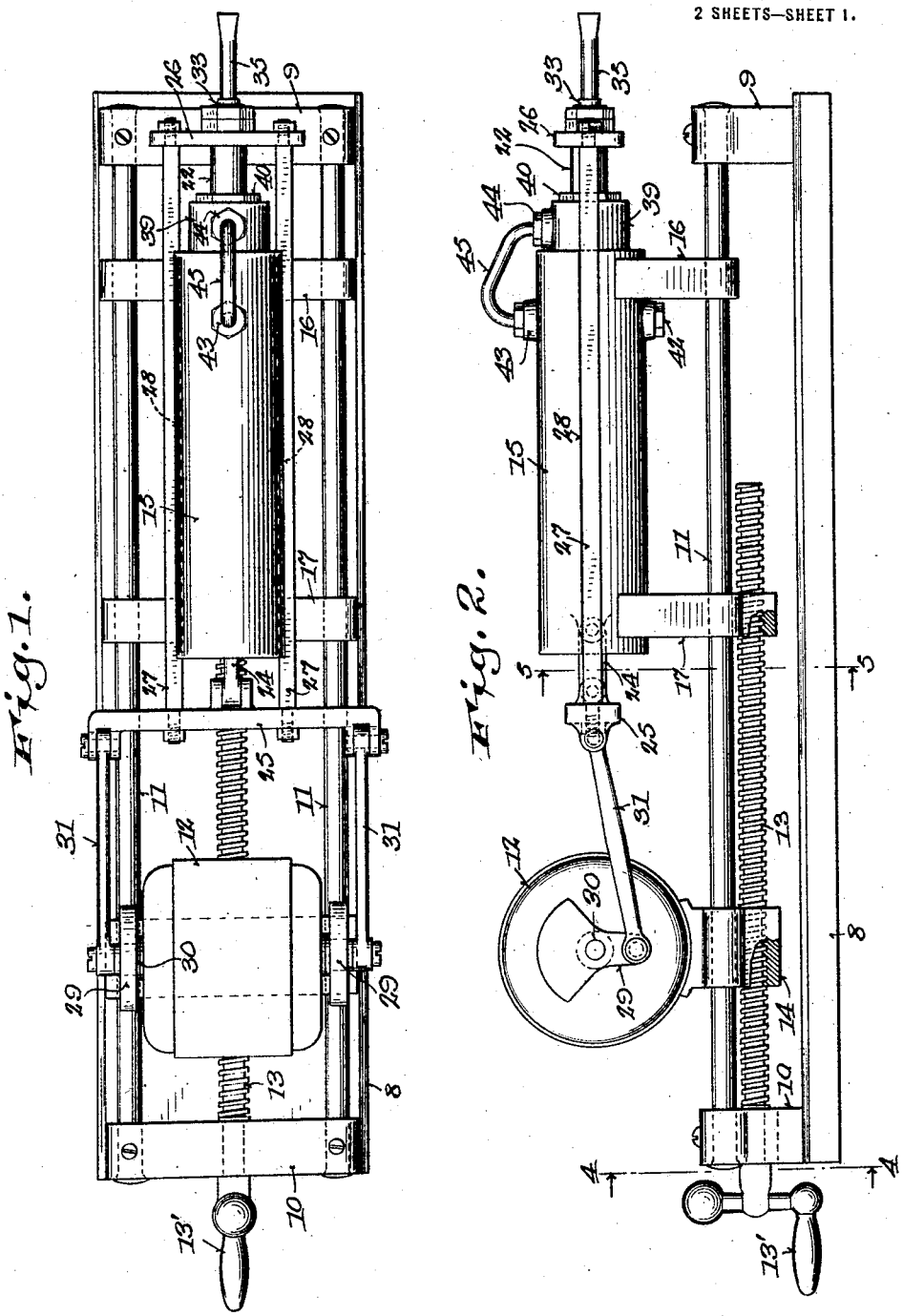

UNITED STATES PATENT OFFICE.

CHARLES W. H'DOUBLER, OF MADISON, WISCONSIN.

PNEUMATIC DRILL.

1,408,176.  Specification of Letters Patent.  Patented Feb. 28, 1922.

Application filed February 3, 1919. Serial No. 274,697.

*To all whom it may concern:*

Be it known that I, CHARLES W. H'DOUBLER, a citizen of the United States, and resident of Madison, in the county of Dane and State of Wisconsin, have invented new and useful Improvements in Pneumatic Drills, of which the following is a description, reference being had to the accompanying drawings, which are a part of this specification.

This invention relates to improvements in pneumatic drills.

It is one of the objects of the invention to provide a pneumatic drill in which the reciprocating tool is particularly adapted for drilling, stone dressing, calking, riveting, dental use, rock drilling, etc.

A further object of the invention is to provide a pneumatic drill in which the reciprocating portion of the drill is actuated by a fluid pressure medium developed in the machine.

A further object of the invention is to provide a pneumatic drill having an air cushion on opposite ends of the reciprocating member so that the impact of the reciprocation of the piston will not be communicated directly to the cylinder of the drill.

A further object of the invention is to provide a pneumatic drill in which the drill and the motor for compressing the air for actuating the drill are mounted to form a unitary structure.

A further object of the invention is to provide a pneumatic drill in which means are provided for automatically discharging the chips or dust from the hole being drilled.

A further object of the invention is to provide a pneumatic drill which is of simple construction, is strong and durable and is well adapted for the purpose described.

With the above and other objects in view the invention consists of the improved pneumatic drill and its parts and combinations as set forth in the claims and all equivalents thereof.

In the drawings in which the same reference characters indicate the same parts in all of the views:

Fig. 1 is a plan view of the improved pneumatic drill;

Fig. 2 is a side view thereof;

Fig. 3 is a central longitudinal sectional detail view of the actuating portion of the pneumatic drill;

Fig. 4 is a transverse sectional view thereof taken on line 4—4 of Fig. 2; and

Fig. 5 is a transverse sectional view thereof taken on line 5—5 of Fig. 2.

Referring to the drawings the numeral 8 indicates a base member upon which are mounted two standards 9 and 10 for holding a pair of supporting rods 11 which are spaced from the base member and each other and extend in parallel relation to each other.

An electric motor 12 slidably mounted on the supporting rods 11 is maintained in adjusted position thereon by a feed screw 13 which is journalled in the standard 10 and is threaded through a depending portion 14 of the motor. A cranked handle 13' on the outer end of the screw 13 provides for turning the screw to advance or withdraw the drill in drilling.

The air cylinder 15 of the drill is provided with depending legs 16 and 17 which are slidably mounted on the supporting rods 11 and the feed screw 13 is also threaded through the leg 17 to maintain the motor and the cylinder relatively spaced from each other and also to feed both motor and cylinder along the rods towards the work. The cylinder is bored to provide a front piston chamber 18, a rear piston chamber 19 and an intermediate or medial piston chamber 20, the intermediate chamber 20 being of less diameter than the other two chambers. A power piston 21 reciprocally positioned in the front chamber is mounted on the inner end of a tubular stem 22 which extends forward through the front end of the cylinder. Another power piston 23 reciprocally positioned in the rear chamber 19 is connected to the inner end of a link 24, and the outer end of said link is connected to a rear cross bar 25 extending transversely of the cylinder. The forward end of the tubular stem 22 is also connected to a cross bar 26 which in turn is connected to the rear cross bar 25 by side bars 27. These side bars slide in grooved ways 28 formed in the opposite sides of the cylinder and cause the two power pistons 21 and 23 to reciprocate as a unitary structure. The said pistons are reciprocated by cranked arms 29 of the motor shaft 30 and the connecting rods 31 which are connected to the transverse bar 25 and the said cranked arms 30.

A floating or hammer piston 32 reciprocally positioned in the medial chamber 20 is of greater length than the said chamber and is mounted on the inner end of a tool stem 33 which extends through the bore of the tubular stem 22 and at its outer end is provided with a threaded socket 34 for receiving the threaded end of a drill 35. The drill 35 is provided with a bore 36 which is in register with a bore 37 formed in the outer end portion of the tool stem 33, and the inner end of the bore 37 is in communication with an annular groove or recess 38 formed around said tool stem 33 for receiving air under pressure to blow out chips and dust from the hole being drilled.

The tubular shank 22 reciprocates through the opposite end walls of an air or water chamber 39 which is threaded into and closes the forward end of the cylinder 15, said end walls of the air or water chamber are provided with stuffing nuts 40 and 40' to form an air tight connection between said walls and the tubular piston stem. The tubular piston stem is provided with a transverse opening or port 41 which registers with the chamber 39 and the annular recess 38 to permit the passage of air or water therethrough from the said chamber to the bore of the tool.

The front portion 18' of the piston chamber 18 between the piston 21 and the air and water chamber 39 is utilized as a pump for supplying fluid under pressure to the said chamber 39 and is provided with a lower inlet valve 42 and an upper outlet valve 43. An upper inlet valve 44 is provided for the air or water chamber 39, and a pipe 45 connects the valved openings 43 and 44 of the two chambers together so that a constant supply of air or water is provided to the bore of the drill 35 for blowing out the chips or dust from the holes being drilled.

In case it is desired to use water for removing the chips or dust from the holes being drilled the valved opening 42 is connected to a source of water supply (not shown).

In reciprocating the floating piston and cutting tool are free to rotate or turn, or if desired means may be provided for turning the same.

In operation the rotation of the motor shaft causes the reciprocation of the two pistons 21 and 32 and the pistons in turn alternately create a pressure and a vacuum in each chamber 18 and 19 and thus cause the reciprocation of the interposed floating piston 32 without coming in direct contact with either power pistons 21 or 23 and thereby eliminating to a large extent transmission of vibration from the tool to the cylinder. As the power pistons are of larger diameter than the floating piston the said floating piston will travel a greater distance than the power pistons and at a greater velocity. As the hole is drilled the drill is advanced by the feed screw, and the air or water will discharge the chips and dust from the hole being drilled.

While the power pistons are shown as preferably of larger diameter than the floating piston it is to be understood that the relative diameters may be varied as desired without departing from the spirit and scope of the invention.

While the tool is shown in the form of a drill it is to be understood that the opening in the tool may be eliminated and the tool used as a pneumatic hammer for riveting or other work without departing from the spirit and scope of the invention.

What I claim as my invention is:

1. A pneumatic tool, comprising a cylinder, a pair of power pistons positioned in said cylinder and connected together outside of the cylinder, a floating piston interposed between the pair of pistons and reciprocated by the pressure and vacuum created thereby, a tool member actuated by the floating piston, and means for simultaneously reciprocating the pair of pistons.

2. A pneumatic drill, comprising a cylinder, a pair of power pistons positioned in said cylinder and connected together outside of the cylinder, a floating piston interposed between the pair of pistons and reciprocated by the pressure and vacuum created thereby, said floating piston having a stem which extends through one of the power pistons, a cutting tool carried by said stem, and means for simultaneously reciprocating both power pistons.

3. A pneumatic drill, comprising a cylinder, a pair of power pistons positioned in said cylinder and connected together outside of the cylinder, means connecting said pistons together to cause them to move simultaneously, a floating piston interposed between the pair of pistons and reciprocated by the pressure and vacuum created thereby, said floating piston having a stem which extends through one of the power pistons, a cutting tool carried by the piston stem, and means for reciprocating the connected together pistons.

4. A pneumatic drill, comprising a cylinder, a pair of power pistons positioned in said cylinder, one of said pistons having a tubular stem which extends out of the cylinder, means connecting said tubular stem to the other piston to cause both pistons to move simultaneously, a floating piston positioned in the cylinder and interposed between the connected together pistons and having a stem which extends through the tubular stem and piston connected thereto, a cutting tool carried by the outer end portion of the floating piston stem, and means for reciprocating the connected together pistons.

5. A pneumatic drill, comprising a cylinder having a pair of outer end bores and a medial bore of less diameter than the outer bores, pistons positioned in the outer bores, one of said pistons having a tubular stem which projects out of the cylinder, the other piston having a link, cross heads connected to the tubular stem and to the link, side bars connecting the cross heads together, a fluid pressure chamber positioned at the forward end portion of the cylinder and through which the tubular piston stem extends, a floating piston positioned in the medial bore and having a stem portion which extends through the tubular piston stem, said floating piston stem having a bore in communication with the fluid pressure chamber, a tubular cutting tool mounted on the outer end portion of the floating piston stem and in communication with its bore, a valved conduit connecting the fluid pressure chamber to the pump portion of one of the outer end cylinder bores, a motor positioned adjacent the cylinder, and a driving connection between the motor and one of the cross heads for reciprocating the pistons.

6. A pneumatic drill, comprising a base member, a motor slidably mounted thereon, a cylinder slidably mounted on the base member, means for adjusting both motor and cylinder on said base member, a pair of pistons within the cylinder and connected together outside of the cylinder and reciprocated by the motor, a floating piston interposed between the pair of pistons but out of engagement therewith and having a stem portion which slidably extends through one of the pair of pistons, and a cutting tool carried by the floating piston stem.

7. A pneumatic drill, comprising a base member, a motor slidably mounted thereon, a cylinder slidably mounted on the base member, means for adjusting both motor and cylinder on said base member, a pair of pistons within the cylinder and connected together outside of the cylinder and reciprocated by the motor, a floating piston of less diameter than the pair of pistons interposed between the pair of pistons but out of engagement therewith and having a stem portion which slidably extends through one of the pair of pistons, and a cutting tool carried by the floating piston stem.

8. A pneumatic drill, comprising a base member, a motor slidably mounted thereon, a cylinder mounted on the base member and movable with the motor, means for adjusting both motor and cylinder longitudinally on the base member, a pair of spaced pistons within the cylinder and connected together outside of the cylinder to reciprocate simultaneously, a driving connection between the motor and the pair of spaced pistons, a floating piston interposed between the spaced pistons but out of engagement therewith and having a stem portion which slidably extends through one of the pair of pistons, and a cutting tool carried by the stem portion of the floating piston.

9. A pneumatic drill, comprising a base member, a motor slidably mounted thereon, a cylinder mounted on the base member and movable with the motor, means for adjusting both motor and cylinder longitudinally on the base member, a pair of spaced pistons within the cylinder and connected together outside of the cylinder to reciprocate simultaneously, a driving connection between the motor and the pair of spaced pistons, a floating piston interposed between the spaced pistons but out of engagement therewith and having a stem portion which slidably extends through one of the pair of pistons, and means for discharging cut particles from the hole being drilled by the cutting tool.

10. A pneumatic drill, comprising a base member, a motor slidably mounted thereon, a cylinder mounted on the base member and movable with the motor, means for adjusting both motor and cylinder longitudinally on the base member, a pair of spaced pistons within the cylinder and connected together to reciprocate simultaneously, a driving connection between the motor and the pair of spaced pistons, one of said pistons having a tubular piston stem which forms a part of the piston connecting means, a fluid pressure chamber carried by the cylinder and through which the tubular stem extends, a floating piston interposed between the spaced pistons and moved thereby and having a stem portion which extends through the tubular stem, a cutting tool carried by the outer end portion of the floating piston stem, said cutting tool and floating piston stem having bores which communicate with the fluid pressure chamber to permit the fluid medium to discharge the cut particles from the drill hole being cut, and a valved communicating passageway between the fluid chamber and the bore of the cylinder between the fluid chamber and one of the pair of pistons.

In testimony whereof, I affix my signature.

CHARLES W. H'DOUBLER.